United States Patent [19]

Meslif

[11] Patent Number: 5,388,984
[45] Date of Patent: Feb. 14, 1995

[54] METHOD OF CONTINUOUS MODULATION OF A FLUID FLOW RATE BY MEANS OF AN ELECTRICALLY CONTROLLED SEQUENTIAL VALVE

[75] Inventor: Alain Meslif, Saint Martin du Tertre, France

[73] Assignee: Gaz de France, Paris, France

[21] Appl. No.: 998,047

[22] Filed: Dec. 29, 1992

[30] Foreign Application Priority Data

Dec. 31, 1991 [FR] France .................. 91 16415

[51] Int. Cl.⁶ ............... F16K 31/06; G05B 11/28
[52] U.S. Cl. ........................... 431/12; 431/1; 431/2; 251/129.05; 251/129.2; 251/129.01; 137/1
[58] Field of Search .......... 251/129.05, 129.2; 431/1, 2, 12; 137/1

[56] References Cited

U.S. PATENT DOCUMENTS

| 3,219,095 | 11/1965 | Nilsson ............... 431/1 X |
|---|---|---|
| 3,307,824 | 3/1967 | Weisheit .............. 251/129.05 |
| 3,765,452 | 10/1973 | Charron . |
| 4,170,339 | 10/1979 | Ueda et al. ........... 251/129.2 |
| 4,205,238 | 5/1980 | Shim et al. . |
| 4,319,606 | 3/1982 | Hoogenboom ...... 251/129.05 X |
| 4,434,933 | 3/1984 | Tamura . |
| 4,766,921 | 8/1988 | Williams ............. 251/129.05 X |
| 4,838,037 | 6/1989 | Wood ................ 251/129.05 X |
| 4,889,314 | 12/1989 | Hashizume et al. ...... 251/129.2 X |
| 5,159,812 | 11/1992 | Nikolaus . |

FOREIGN PATENT DOCUMENTS

| 0048440 | 3/1982 | European Pat. Off. . |
|---|---|---|
| 2395464 | 1/1979 | France . |
| 2417800 | 9/1979 | France . |
| 2501844 | 7/1975 | Germany .............. 251/129.2 |
| 3943357 | 7/1991 | Germany . |
| 2001747 | 2/1979 | United Kingdom . |

OTHER PUBLICATIONS

Barry Friedman, "Modulated-Pulse Amplifiers Revived", Electronics & Wireless Workd, vol. 93, No. 1614, Apr. 1987, pp. 415–420.

Primary Examiner—Arnold Rosenthal
Attorney, Agent, or Firm—Steinberg, Raskin & Davidson

[57] ABSTRACT

A method of continuously modulating a fluid flow rate by means of an electrically controlled sequential valve, consisting in reciprocating the electrically controlled valve provided in a passageway conveying the fluid towards an apparatus to be fed therewith, between a position opening and a position closing said passageway, the frequency of the displacements towards either one of the valve positions being constant whereas the period of holding of the valve in the other position varies in accordance with the flow rate to be obtained, the method being applicable to the adjustment of the flow rate of a fluid such as a gas for a cooking apparatus for instance.

12 Claims, 2 Drawing Sheets

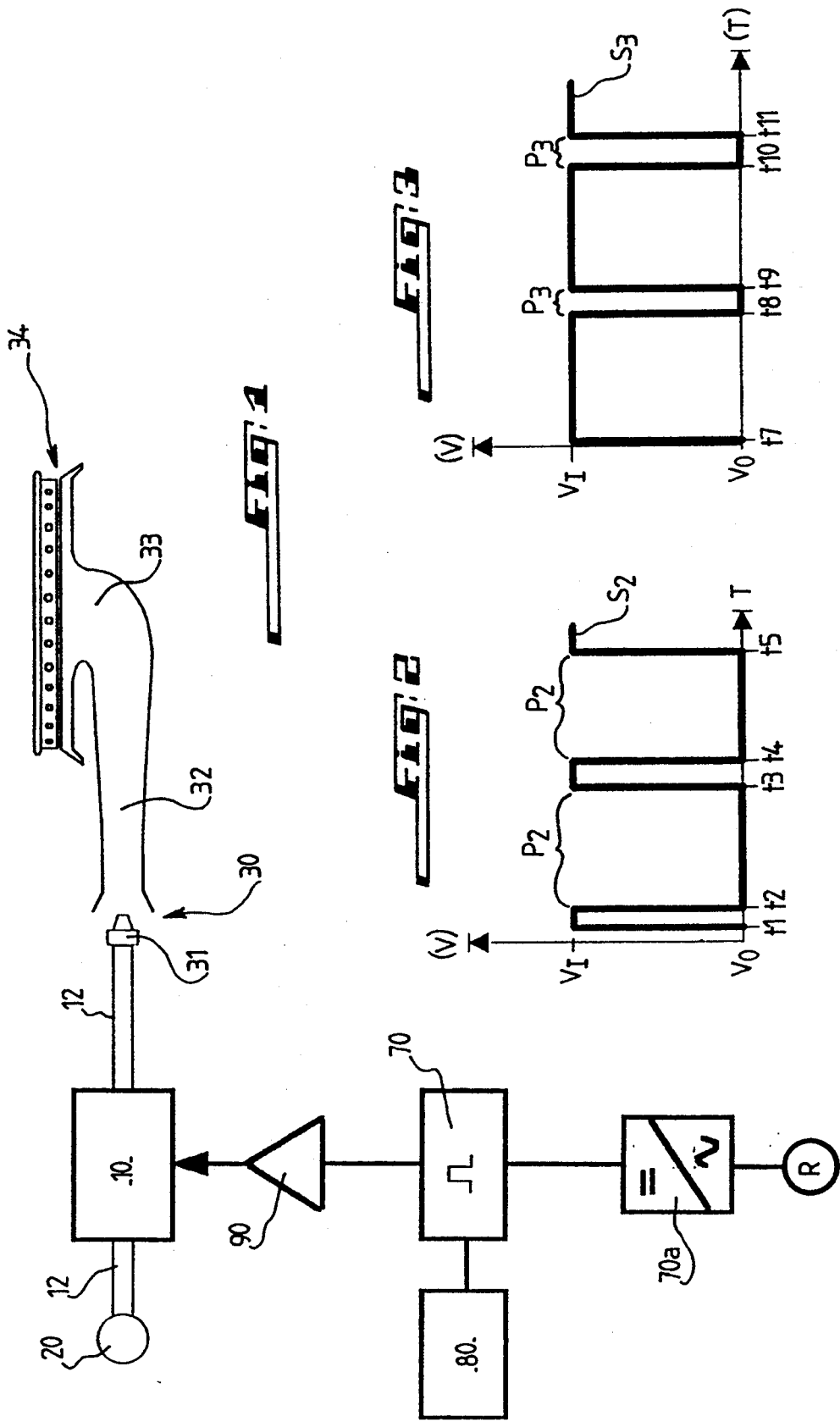

METHOD OF CONTINUOUS MODULATION OF A FLUID FLOW RATE BY MEANS OF AN ELECTRICALLY CONTROLLED SEQUENTIAL VALVE

The present invention relates to a method of continuous modulation of a fluid flow rate by means of an electrically controlled sequential valve.

There are known various methods of modulating a fluid flow rate for example to adjust the supply of a cooking or heating device with a gaseous fuel.

In the prior art there has been proposed to modulate the gas flow rate for such devices by providing a profiled cock or plug valve in a gas carrying passageway or duct which connects the device to a source of gas under pressure. The valves of this kind allow to adjust a fluid flow rate "in continuous relationship", i.e. gradually through variation of the cross-sectional area of this passageway and may be operated either by hand or electrically by means of keys, sliders or potentiometers acting for instance upon a step-by-step motor operatively coupled to the plug or cock.

However the known power-operated valve devices generally are bulky, mechanically complex and expensive so that they are not suited to economically modulate the flow rate of devices of reduced sizes such as a cooking plate the thickness of which should not exceed 30 mm.

Furthermore it is known to modulate the flow rate of a fluid not by varying the surface area of the gas passageway cross-section but by alternately or sequentially discontinuing the gas flux in this passageway. It is thus possible to reduce the gas amount supplied to the device per unit of time. To do this, there is often provided an electrically operated valve in the passageway, this valve moving with a fixed and predetermined frequency between a position opening and a position closing the said passageway.

Although this method makes possible the adjustement of the duration of motion of the valve, it does not allow to modulate continuously and with accuracy between a maximum flow rate and a minimum flow rate, the gas flux supplied to the device. Moreoever in the case of devices comprising a burner, the flame of the latter would extinguish if the motion frequency of the valve is too low.

The object of the invention is therefore to provide a method of continuously modulating a fluid flow rate, which be without any danger, accurate and economical while being applicable to devices of reduced sizes.

For that purpose the subject of the invention is a method of modulation of a fluid flow rate for example of a gas of the type consisting in reciprocatingly displacing an electrically operated valve provided in a passageway for the fluid towards a device to be fed therewith, between a position opening and a position closing said passageway, characterized in that the frequency of the displacements towards one of the positions of the valve is constant whereas the period of holding the valve in the other position varies as a function of the flow rate to be obtained.

The method is also characterized in that the displacement towards the opening position is effected at a fixed frequency and the period of holding in closed position varies between 0 and 100% of the duration separating two displacements into the opening position exclusively.

According to another characterizing feature of the method, the aforesaid constant frequency is higher than 20 Hz and preferably lying between 25 and 30 Hz.

According to still a further characterizing feature, the aforesaid valve is movably mounted in a fluid-tight casing integrated into the aforesaid passageway and comprising fluid inlet and outlet connections as well as an electro-magnet adapted to displace the said valve between its opening and closing positions for opening and closing the outlet connection hence the passageway.

A first embodiment of the invention is characterized in that the valve is mounted within the casing through the medium of a swinging arm constantly urged by a spring towards the closing position of the valve and caused to bear upon a damping stop when the valve is in the opening position.

A second embodiment is characterized in that the valve is mounted in the casing through the agency of a flexible strip or blade constantly urged by a spring towards the closing position of the valve and embedded into the casing with its end opposite to the electro-magnet.

It should be pointed out that the electrical control of the valve is effected in accordance with a generally positive and square-shaped voltage signal delivered to the electro-magnet after amplification by a modulating device connected on the one hand to an a.c. power supply system and on the other hand to a regulating system.

The method is further characterized in that the aforesaid modulating device converts the alternative current from the power supply system into a direct current before modulating it into a control signal in accordance with the state of the regulating system, which comprises an electronic card connected to an analog runner or preferably to digital keys.

It should moreover be specified that the method according to the invention allows to modulate the flow rate of the injector of a fuel gas burner, preferably for a cooking device into which the casing of the valve as well as the modulating device are integrated.

The invention will be better understood and further objects, characterizing features, details and advantages thereof will appear better as the following explanatory description proceeds with reference to the accompanying diagrammatic drawings given by way of non-limiting examples only illustrating several presently preferred specific embodiments of the invention and wherein:

FIG. 1 diagrammatically shows a cooking apparatus the gas flow of which is modulated according to the method according to the invention;

FIG. 2 is a graphical diagram illustrating an example according to the invention for the modulation with a reduced flux of a flow rate, wherein the time is plotted in abscissae and the positions of a sequential valve are plotted in ordinates;

FIG. 3 is a graphical diagram similar to FIG. 2 but illustrating an example of modulation with a high flux of a flow rate;

Figure 4:
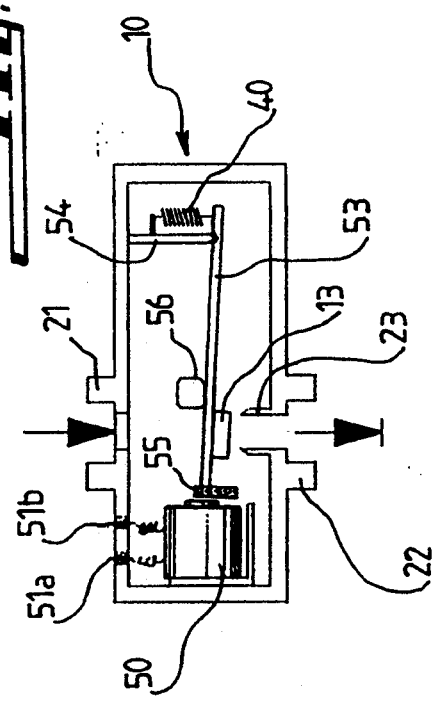
FIG. 4 is a view in partial cross-section of a first embodiment of the sequential valve according to the invention shown in the closing position.

Referring at first to FIGS. 1, 4 and the following, there is seen a casing 10 provided in a passageway or duct 12 which extends from a source of fluid under pressure 20 towards a device 30 to be fed with this fluid.

More specifically the casing 10 comprises an electrically controlled valve 13 which may be displaced in reciprocating or sequential relationship between a position opening (FIGS. 5 and 7) and a position closing (FIGS. 4 and 6) the duct 12 in order to proceed with the modulation of the flow rate of a fuel gas such as natural gas, butane or the like for the device 30, here a cooking plate. The device 30 may of course also be of any other type as for instance a heating device.

According to the method of the invention, the frequency of the sequential displacements towards one of the opening and closing positions of the valve 13 is constant whereas the period of holding this valve 13 in the other position varies in accordance with the continuous modulation of the flow rate it is desired to be obtained.

On FIGS. 2 and 3 there are seen signals S2 and S3 for the control of the valve 13. Each one of these signals S2, S3 the envelope of which has a square or crenel shape varies instantaneously between two stationary values VO and VI in order that the voltage of the signals S2 and S3 be constantly higher (VI) than or equal (VO) to zero volt.

Figure 5:
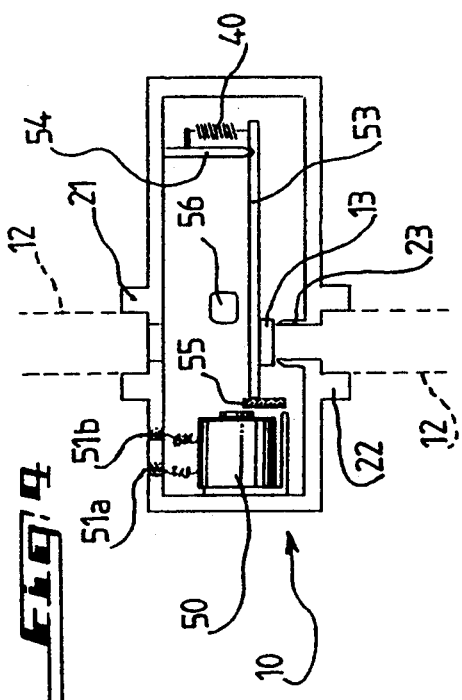
FIG. 5 is a view similar to FIG. 4 but illustrating the opening position of the valve.
Figure 6:
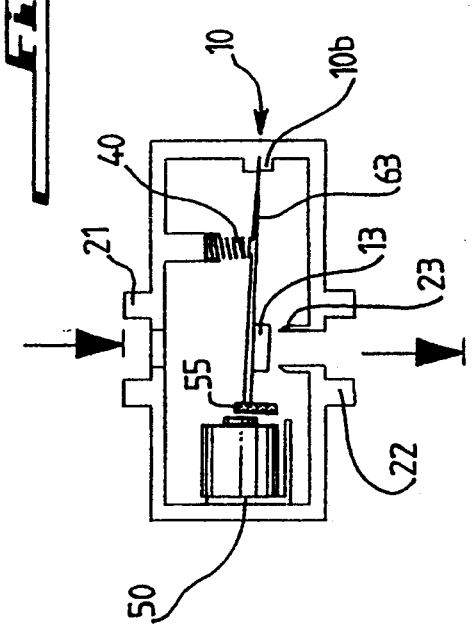
FIG. 6 is a view in partial cross-section of a second embodiment of the sequential valve according to the invention shown in the closing position.

From the diagrams of S2 and S3, it is understood that VI is a so-called activation voltage under the effect of which the valve 13 is displaced and held in its position of opening the passageway 12 (FIGS. 5 and 7) whereas VO is a substantially zero so-called release voltage so that the valve is moving towards its position of closing the passageway 12 whereas the voltage of the signal S2 or S3 is equal to this value VO (FIGS. 4 and 6).

According to the illustrated example, it is the frequency of the variations of the voltages of the signals S2, S3 occurring at the times t ; t3; t5; t7; t9 and t11 which is fixed. In fact since the voltage V of the signals S2 and S3 changes from the value VO to the value VI at regular intervals, the valve 13 which is operated by these release and activation voltages, respectively, moves at a constant frequency from its shutting position towards its opening position. Indeed the flow rate modulation is obtained by varying the length of the period of time during which the valve 13 is held in the position closing the passageway 12. This variable length corresponds on FIG. 2 to the periods designated at P2 (between t2 and t3; t4 and t5) and corresponds on FIG. 3 to the periods indicated at P3 (between t8 and t9; t10 and t11) where the voltages V of the signals S2, S3 are equal to VO.

The periods of holding the valve 13 in the shutting position may vary between 0 and 100% (exclusively) of the duration separating two displacements of the valve 13 into the opening position. This variation of course is possible to the exclusion of the limit values of 0 and 100% at which the valve 13 is no longer moving between its two positions but constantly remains in the opening position and in the closing position, respectively. Thus since the periods corresponding to either one (VI) or (VO) of the states of the signals S2, S3 define the changes in the position of the valve 13, it is understood that FIG. 2 illustrates a gaseous fluid flux modulation at a small flow rate since the period (t1–t2) corresponding to the opening position is clearly shorter than the period P2 (t2–t3) corresponding to the position of closing the passageway duct 12. Likewise FIG. 3 illustrates a modulation with a substantial flow rate since the period (t7–t8) of opening of the valve 13 is clearly longer than the shutting period P3 (t8–t9).

In the case where as seen on FIG. 1 the device 30 comprises a burner 34 connected to the pipeline 12 by a Venturi nozzle 32 and a pressure-reducing or expansion valve 33, the frequency of the movements of the valve 13 should be selected so as to avoid that the closing of the latter results in the extinguishing of the flame of the burner. Therefore the aforesaid constant frequency is always above 20 Hz and is preferably lying between 25 Hz and 30 Hz.

Referring to FIGS. 4 to 7, two embodiments of the casing 10 will be successively described. In these two embodiments the like or similar parts are designated by the same reference numerals.

In both embodiments illustrated the valve 13 is movably mounted in a casing 10 which is fluid-tight and integrated into the passageway 12 as shown in dashed lines on FIGS. 4 and 6. Each fluid-tight casing 10 comprises a connecting inlet neck or fitting 21 onto which that portion of the pipeline 12 which is connected to the source of fluid under pressure 20 is mounted in sealing relationship. Likewise each casing 10 comprises a connecting outlet neck or fitting 22 onto which a section of the pipeline 12 which is connected to the device 30 proper (here through the medium of an injector 31) is mounted in fluid-tight relationship. On FIGS. 4 to 7 it is seen that the valve 13 is arranged in front of a throat 23 of the connecting outlet neck or fitting 22 so as to shut off this neck or fitting 22 hence the pipeline 12 when it is in the closing position. In other terms the valve 13 is arranged in the casing 10 so as to engage the throat 23 of the connecting neck or fitting 22 in sealing relationship and thus prevent any gas flows between the source 20 and the device 30 as shown on FIGS. 4 and 6. On the contrary as shown by the arrows of FIGS. 5 and 7, when the valve 13 and the throat 23 are separated, a flux of pressure fluid may flow in the passageway 12 through the casing 10.

According to the first embodiment of FIGS. 4 and 5, the valve 13 is mounted in the casing 10 through the medium of an oscillating arm 53. More specifically the oscillating or swinging arm 53 is mounted on a pivot 54 and is constantly biased towards its position of shutting off the connecting neck or fitting 22 by a coil spring 40. The pivot 54 and the spring 40 are arranged in close relation to one end of the oscillating arm 53 whereas an element sensitive to magnetism such as a ferromagnetic chip or wafer 55 is fastened at the other end of the arm 3 in opposite relation to an electromagnet 50 or the like.

The electromagnet 50 is electrically fed through the agency of two lead wires 51a, 51b which extend through the casing 10 in sealing relationship. A part made from resilient or elastic material 56 is fastened inside of the casing 10 so that the swinging arm 53 is caused to bear upon this part 56 when the valve 13 is in the opening position (FIG. 5). In fact the part 56 performs the function of a damping stop to avoid the effects of any bouncing of the arm 53. It is obvious that the whole arrangement formed of the chip 55, the valve member 13 and the arm 53 should be made from materials light enough in order that its inertia allows it to operate at the chosen frequency.

Figure 7:
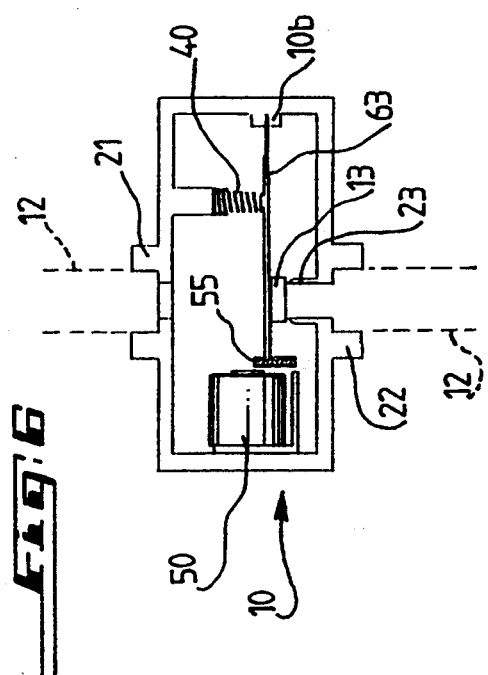
FIG. 7 is a view similar to FIG. 6 but illustrating the opening position of the valve.

According to the second embodiment of FIGS. 6 and 7, the valve member 13 is mounted in the casing 10 through the medium of a flexible strip or blade 63 which is itself also constantly biased by a spring 40. The blade or strip 63 is built into a suitable portion 10b of the casing 10 at its end opposite to the electromagnet 50.

It is already understood that in the first and second embodiments, the proportional voltage VO or VI feeding the electromagnet 50 allows to exert upon the chip or wafer 55 a sequential magnetic force opposing the action of the springs 40 for opening the connecting outlet necks of fittings 22.

It should be pointed out that the electrical control of the valve member 13 is performed in accordance with signals such as S2 and S3 after amplification by a modulating device 70 connected on the one hand to an alternative current supply system or network R and on the other hand to a regulating system 80.

The amplification of the control signals is carried out by a suitable amplifier 90 interposed between the modulating device 70 and the coil or winding 50 of the casing 10. The modulating device 70 also comprises a transformer 70a adapted to convert the alternative current from the supply system or network R into a direct current prior to modulating it into a control signal according to the state of the regulating system. Although this has not been shown, the regulating system 80 comprises an electronic card connectted to analog or digital control members. These control members may be analog slide runners or potentiometers but preferably digital keys or contacts the aesthetic appearence of which is better and the bulk or size of which is smaller. Such members are acting upon the card when they are manipulated by a user to change the state of the system 80 in order that it corresponds to the desired gas flow rate. According to this state the device 70 would determine the suitable closing period and accordingly modulate the signal controlling the valve member 13.

It is obvious that a casing such as the casing 10 may be easily made with reduced dimensions of the order of 50×20×15 mm in the case where the power consumed by the electromagnet 50 in particular is lower than 2 watts. Such a power is fully sufficient for a burner the power of which is 3 kW.

It has therefore been provided according to the invention a method of continuously modulating a fluid flow rate which is without any danger, accurate and economical while being applicable to the adjustement of the flow rate of the injector of a fuel gas burner preferably for a cooking device. In such a case the casing 10, the amplifier 90, the modulating device 70 as well as the control system 80 could be integrated into the apparatus 30 with a view to improve the aesthetic appearence and to reduce the bulk or size of this apparatus.

It is further obvious that the invention is not at all limited to the technical means described and illustrated but comprises all the equivalents of these means as well as their combinations if the latter are carried out according to its gist and within the scope of the appended claims.

What is claimed is:

1. A method for modulating the flow rate of an injector of a fuel gas burner, comprising the steps of:
    arranging a fluid-tight casing in a passageway through which fuel gas is conveyed to the fuel gas burner,
    providing said fluid-tight casing with inlet and outlet connecting neck fittings for an inlet flow of the fuel gas from said passageway and an outlet flow of the fuel gas to said passageway, respectively,
    mounting an electrically controlled valve member in said fluid-tight casing movable between a position opening said passageway and a position closing said passageway,
    providing an electromagnet in said fluid-tight casing for moving said valve member in a reciprocating relationship in order to open and close said outlet connecting neck fitting and thus said passageway,
    said valve member being mounted in said fluid-tight casing through the agency of a flexible strip constantly biased by a spring towards said closing position of said valve member, said spring having a first end closest to said electromagnet and a second end, opposite to said first end, built into said fluid-tight casing,
    maintaining the frequency of the displacements of the valve member toward said opening position constant,
    varying the time period in which the valve member is maintained in said closing position in accordance with a desired flow rate of the flue gas, and
    selecting the constant frequency of the displacement of the valve member toward said opening position in a range from about 20 Hz to about 30 Hz to prevent the flame of the burner from being extinguished in operation.

2. A method for modulating the flow rate of an injector of a fuel gas burner, comprising the steps of:
    arranging a fluid-tight casing in a passageway through which fuel gas is conveyed to the fuel gas burner,
    providing said fluid-tight casing with inlet and outlet connecting neck fittings for an inlet flow of the fuel gas from said passageway and an outlet flow of the fuel gas to said passageway, respectively,
    mounting an electrically controlled valve member in said fluid-tight casing movable between a position opening said passageway and a position closing said passageway,
    providing an electromagnet in said fluid-tight casing for moving said valve member in a reciprocating relationship in order to open and close said outlet connecting neck fitting and thus said passageway,
    providing electrical control of said valve member by generating a signal with a generally positive square-shaped voltage by means of a modulating device, amplifying the signal and then delivering the signal to said electromagnet, said modulating device being connected at a first end to an alternative current supply network and at an opposite second end to a regulating system,
    maintaining the frequency of the displacements of the valve member toward said opening position constant,
    varying the time period in which the valve member is maintained in said closing position in accordance with a desired flow rate of the flue gas, and
    selecting the constant frequency of the displacement of the valve member toward said opening position in a range from about 20 Hz to about 30 Hz to prevent the flame of the burner from being extinguished in operation.

3. The method of claim 2, wherein said valve member comprises an oscillating arm, the method further comprising the steps of providing a spring to bias said oscillating arm toward said closing position of said valve member, and arranging a damping stop in said fluid-tight casing to stop the movement of said valve member from said closing position into said opening position.

4. A method according to claim 2, wherein said modulating device converts the current from the supply network into a direct current prior to modulating it into a control signal according to the state of the regulating system which comprises an electronic card connected to an analog slide runner.

5. A method according to claim 2, wherein said modulating device converts the current from the supply network into a direct current prior to modulating it into a control signal according to the state of the regulating system which comprises an electronic card connected to digital keys.

6. The method of claim 1, wherein said flexible strip includes a ferromagnetic wafer arranged at said first end in proximity to said electromagnet.

7. A method for modulating the flow rate of an injector of a fuel gas burner, comprising the steps of:

arranging a fluid-tight casing in a passageway through which fuel gas is conveyed to the fuel gas burner, arranging a pivotable valve member in said fluid-tight casing, the valve member pivoting between a first position in which the passageway is open and a second position in which the passageway is closed, providing the valve member with a flexible strip constantly biased by a spring towards the second position of the valve member, mounting a first end of said flexible strip on said fluid-tight casing, pivoting the valve member at a constant frequency from the first position to the second position to close the passageway, maintaining the valve member in the second position for a variable time period in accordance with the flow rate to be obtained, and selecting a frequency of the pivoting movement of the valve member to the second position in a range from about 20 Hz to about 30 Hz.

8. The method of claim 7, further comprising arranging an electromagnet in an interior of the casing in proximity to a second end of the valve member opposite to the first end of the valve member.

9. The method of claim 8, further comprising generating a signal with a generally positive square-shaped voltage, amplifying the signal, and then delivering the signal to the electromagnet to provide electrical control of the valve member.

10. The method of claim 7, wherein the constant frequency is about 25 Hz.

11. The method of claim 8, further comprising arranging a ferromagnetic wafer on the second end of the valve member to cooperate with the electromagnet to control the pivoting of the valve member.

12. The method of claim 7, wherein the frequency is selected to prevent a flame of the gas burner from being extinguished in operation.

* * * * *